US011276011B2

(12) United States Patent
Bouillet et al.

(10) Patent No.: US 11,276,011 B2
(45) Date of Patent: Mar. 15, 2022

(54) SELF-MANAGED ADAPTABLE MODELS FOR PREDICTION SYSTEMS

(71) Applicant: INTERNATIONAL BUSINESS MACHINES CORPORATION, Armonk, NY (US)

(72) Inventors: Eric P. Bouillet, Malahide (IE); Bei Chen, Dublin (IE); Randall L. Cogill, Dublin (IE); Thanh L. Hoang, Kildare (IE); Marco Laumanns, Zurich (CH); William K. Lynch, Limerick (IE); Rahul Nair, Dublin (IE); Pascal Pompey, Nanterre (FR); John Sheehan, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 914 days.

(21) Appl. No.: 15/483,016

(22) Filed: Apr. 10, 2017

(65) Prior Publication Data

US 2018/0293511 A1   Oct. 11, 2018

(51) Int. Cl.
*G06N 20/00* (2019.01)
*H04L 67/12* (2022.01)
*H04L 67/10* (2022.01)
*G06N 5/02* (2006.01)

(52) U.S. Cl.
CPC ............ *G06N 20/00* (2019.01); *G06N 5/022* (2013.01); *H04L 67/10* (2013.01); *H04L 67/12* (2013.01)

(58) Field of Classification Search
CPC ........ G06N 20/00; G06N 5/022; H04L 67/10; H04L 67/12
See application file for complete search history.

(56) References Cited

U.S. PATENT DOCUMENTS

| 5,933,822 | A  | * | 8/1999 | Braden-Harder ... G06F 16/3344 |
| 7,469,402 | B2 |   | 12/2008 | Bender et al. |
| 8,073,790 | B2 |   | 12/2011 | Soetjahja |
| 8,176,465 | B2 |   | 5/2012 | Dutta et al. |
| 9,043,337 | B1 |   | 5/2015 | Chen et al. |
| 2014/0046879 | A1 |   | 2/2014 | Maclennan et al. |
| 2015/0025866 | A1 |   | 1/2015 | Vanderzweep et al. |
| 2015/0324686 | A1 |   | 11/2015 | Julian et al. |
| 2015/0379166 | A1 |   | 12/2015 | Xin et al. |
| 2017/0124487 | A1 | * | 5/2017 | Szeto ..................... G06N 20/00 |
| 2017/0193392 | A1 | * | 7/2017 | Liu ......................... G06N 20/00 |

FOREIGN PATENT DOCUMENTS

EP   1677187 A1   7/2006

OTHER PUBLICATIONS

Feurer et al, "Efficient and Robust Automated Machine Learning", 2015, Advances in Neural Information Processing Systems, all pages (Year: 2015).*
"Create with ModelCAD," AI Expert, vol. v6, No. n8, 1991 (2 pages).

* cited by examiner

*Primary Examiner* — Daniel C Puentes
(74) *Attorney, Agent, or Firm* — Griffiths & Seaton PLLC

(57) ABSTRACT

Embodiments for self-managed adaptable models for prediction systems by one or more processors. One or more adaptive models may be applied to data streams from a plurality of data sources according to one or more data recipes such that the one or more adaptive models predict a plurality of target variables.

16 Claims, 11 Drawing Sheets

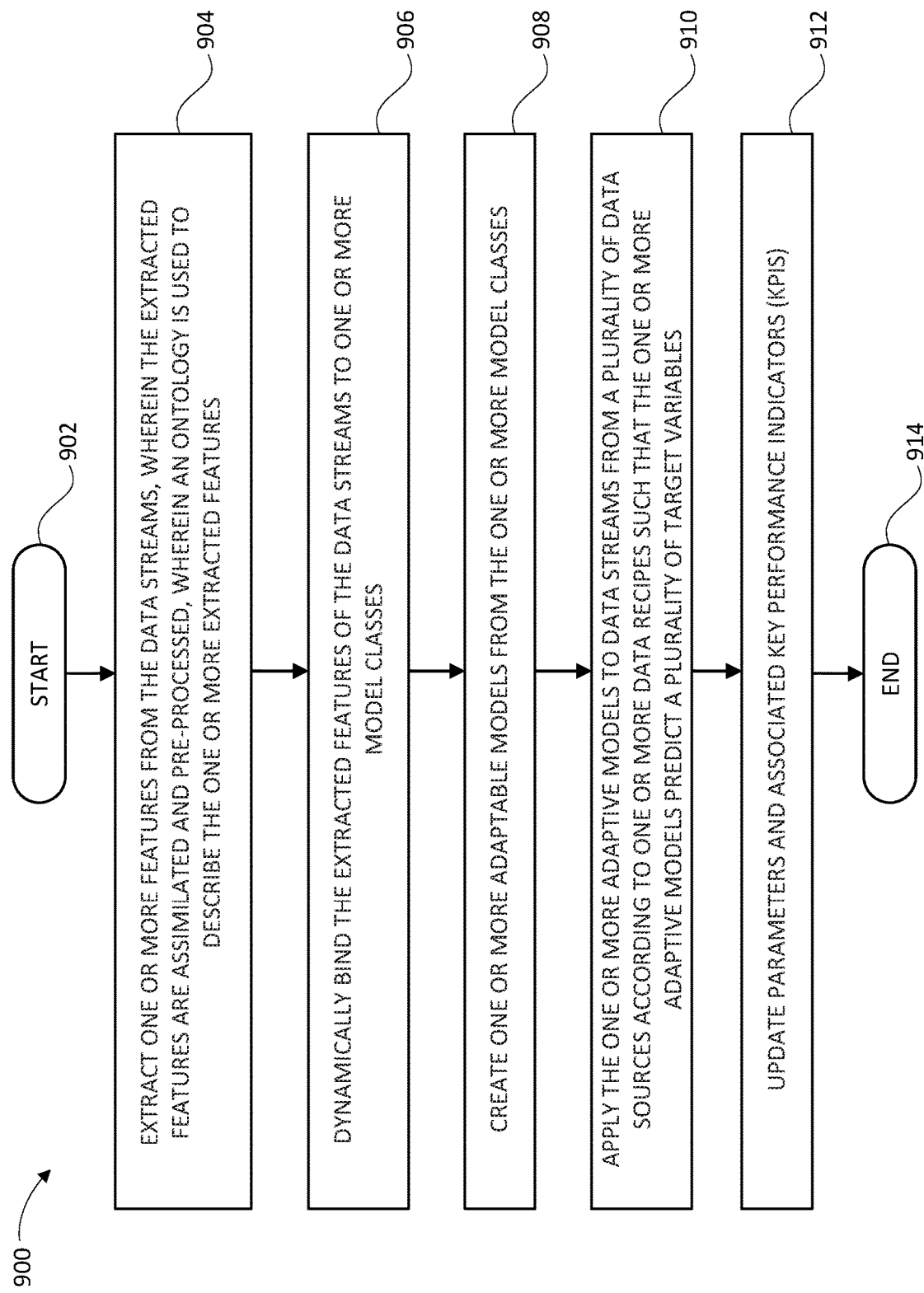

SELF-MANAGED ADAPTABLE MODELS FOR PREDICTION SYSTEMS

BACKGROUND OF THE INVENTION

Field of the Invention

The present invention relates in general to computing systems, and more particularly to, various embodiments for self-managed adaptable models for prediction systems using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for self-managed adaptable models for prediction systems by a processor, are provided. In one embodiment, by way of example only, a method for self-managed adaptable models for prediction systems, again by a processor, is provided. One or more adaptive models may be applied to data streams from a plurality of data sources according to one or more data recipes such that the one or more adaptive models predict a plurality of target variables. The one or more data recipes include the extracted features of the data streams, the one or more model classes for application on the data streams by the one or more adaptive models, and key performance indicators (KPIs).

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9 is a flowchart diagram depicting an exemplary method for self-managed adaptable models for prediction systems by a processor, in which aspects of the present invention may be realized.

DETAILED DESCRIPTION OF THE DRAWINGS

Figure 1:
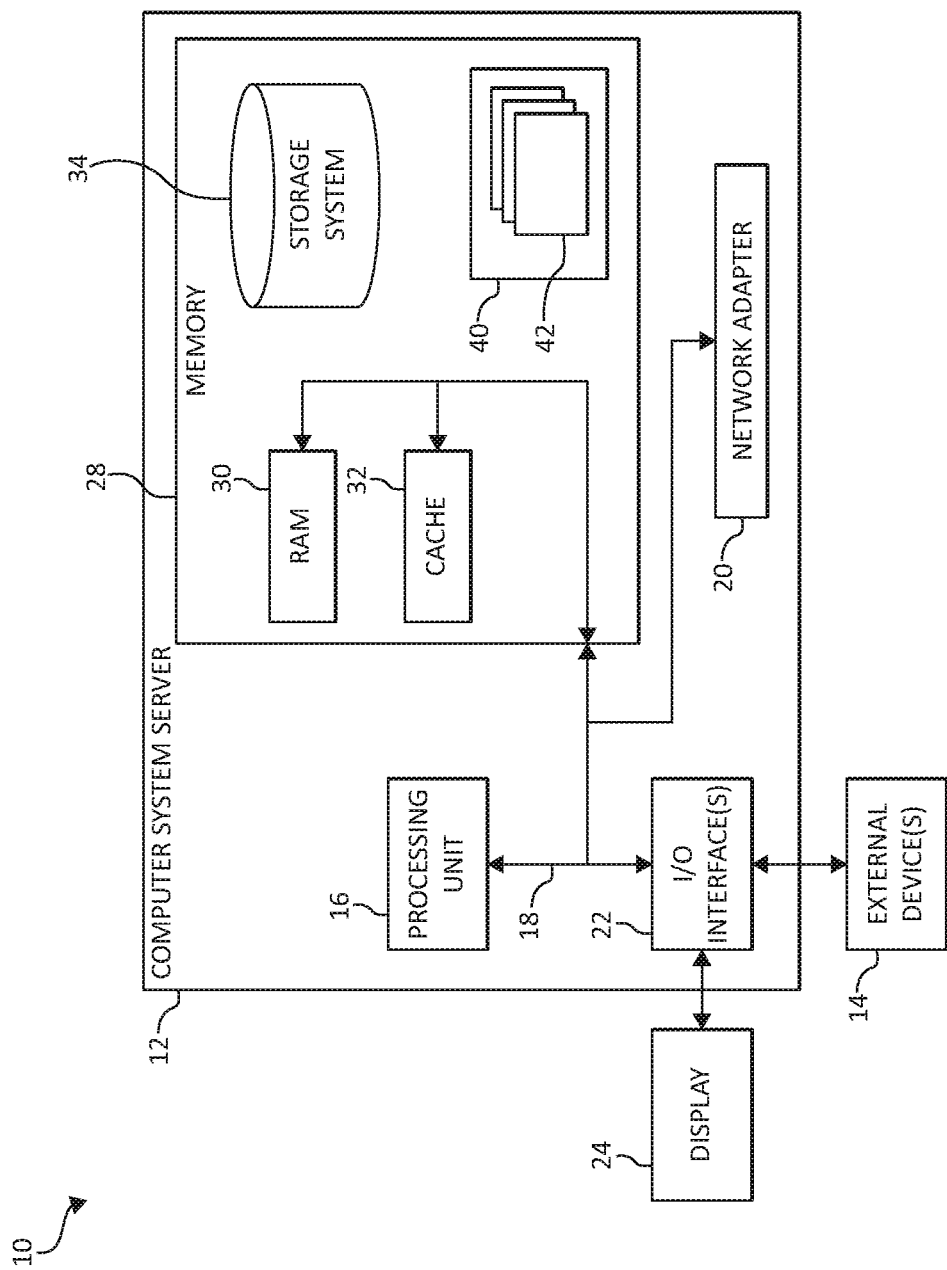
FIG. 1 is a block diagram depicting an exemplary cloud computing node according to an embodiment of the present invention.

The mechanisms of the illustrated embodiments relate to computer automated predictive modeling, and more specifically self-managed adaptable models for prediction systems. In one aspect, a prediction model may be used to predict various occurrences. In its simplest form, a prediction model may be based on past behavior to determine future behavior. The process of predictive modeling attempts to predict a most likely outcome for a given starting condition based on a model. Various models can be used in this context, such as the naive Bayes model, the k-nearest neighbor algorithm, logistic regression, etc. A predictive model can use a ground truth set (i.e., a data set comprising members of a known classification) to train a classifier to automatically classify unknown members of an input data set.

However, a current challenge for deployment of predictive modeling is often a phenomenon may be too complex to explain with a single analytical model. The mechanisms of the present invention provide a solution that automatically couple multiple analytical models with data sources while providing scalable automatic management of derived models and analytical results. In one aspect, the predictive modeling may be employed in large-scale prediction systems (e.g., such as predicting millions of target predictor variables) and may be built based on models built through exploratory analytics on subsets of data, before being deployed for production use. For example, a "template model" (e.g., "model class") may be built that ideally performs, according to a user's expectations, on a data subset and then employs a model management asset to deploy the template model to prediction streams.

In one aspect, the model management asset may automatically determine which of the various model classes are an optimal or "best" fit for each input or "data stream" (abstract dependency declaration and resolution). The model management asset may adapt (e.g., dynamic binding) the input or "data stream" to a model and compose preprocessing components to transform the input or data stream for the model. The model management asset may also automatically create new models from the model class when a new prediction stream (predictor variable) is detected (model spawning), automatically manage new models, maintain a lineage of the models for audit or troubleshooting purposes (model harvesting), automatically (re)train the models as new input is available, and maintain/track model versions. Additionally, the model management asset may perform model validation model scoring (model management), automatically compute new model responses as new input is available (model scoring), and automatically manage model responses, maintain lineage of model version and input (model response lineage).

The mechanisms of the present invention provide a solution for self-managed adaptable models for prediction systems by automatically plugging in new model types or new data sources into a predictive system housing arbitrary numbers of other models and other data sources. In short, the present invention (1) applies new models to each of the applicable data sources defined for a selected or defined model class, and (2) applies existing models to any new data source that is added into the system. In one aspect, term "pluggable" model may be used to describe models that can be directly plugged into streaming systems without explicitly binding the pluggable model to data and/or a specific configuration.

In one aspect, one or more adaptive ("pluggable") models may be applied to data streams from a plurality of data sources according to one or more data recipes such that the one or more adaptive models predict a plurality of target variables. The one or more data recipes include the extracted features of the data streams, the one or more model classes for application on the data streams by the one or more adaptive models, and key performance indicators (KPIs).

The mechanisms of the embodiments provide for automating the application to and construction of an arbitrary number of models based on an arbitrary number of data flows/data streams. The self-managed adaptable models for prediction system may include a model repository (e.g., model store) storing model parameters, model class, description and a pointer to the training of the model, and test and validation data. The self-managed adaptable models for prediction system may also include a data recipe store enabling to describe generic data processing pipelines, a data store indexing all the data sources available as well as providing access to it, and an application runtime capable of interpreting and deploying the workflows described in the data recipe store, if required using the models from the model store.

In one aspect, as described herein, in relation to the term "data", the data may include input and output data assumed to be presented in a form of tables of ordered rows (which may be ordered by time) and may be of an unbounded length. The columns of the table may correspond to a feature or a measure of an observed phenomenon, which can be categorical or numerical, such as a train type, and travel times. A row in the table may correspond to a set of values that may be considered together in the analytics. A row may correspond to values that have been observed at a same time and/or within an acceptable time interval. However, a time alignment may not be a requirement and some columns may have a lag (i.e. values observed at different time intervals). Also, it may not be required that all the columns in the row have a value. The data may also be sparse, i.e. some values are missing.

In relation to the term "model class", the model class may be defined by (1) a type of model, (2) an abstract description of the model inputs, and/or (3) model parameter values. The abstract description may not be needed to specify a selected or defined instance of the input source (e.g., the input source may not exist yet). The model class may include a description to find a matching source and recipes to use the inputs in the model. The description may include a description of the attributes required by the model class, a partitioning rule (group-by), a filter, and/or a lag parameter (for time series) and simple transforms (scaling and translation for numerical values). For example, consider the following pseudocode example for a description of a model class, which may include the model type and various parameters, for predicting speed/arrival of a particular train:

Model type: Parametric generalized additive model ("GAM")
Inputs:
Input attributes K: (k1=Timestamp, k2=Train type identification "ID", k3=Railway stretch ID, k4=Railway stretch travel-time)
Group-models by: k1, k2
Filter: k4>2016/02/16 10:00:00
Transforms into model input V: (v1=k1, v2=k2, v3=k3, v4=k4*3600)
Parameters:
Horizon: 1 hour
Spline: cubic In relation to the term "model class input", a model class input may include an input attribute expected by a model class, individual measurable property of a phenomenon being observed, using the data definition, the inputs indicate or specify a subset of the column IDs of the data. The term model class input may be an input, predictor, explanatory variable, and/or exposure variable.

In relation to the term "model response", a model response may be the output of a model in response to an input. The model response may also be a model explanation, a model measurement, output, outcome, and/or predicted value.

In relation to the term "model instance", a model instance may be a specific set of model parameters resulting from applying a model class to a set of data, particularly since a model class is ineffective or "untrained" until it is trained by applying some data on the model class. Also, training a model class using multiple model input partitions (i.e. having different group-by columns using the previous model class example) resulting in multiple model instances may be spawned from that model class.

In relation to the term "model version", a model version may be a snapshot of a model instance taken at points in time during its training phase. Multiple versions of the same model instance may be created using multiple segments of the same input partition (i.e. the multiple versions have the same group value).

In relation to the term "feature extraction", feature extraction may include pre-processing from which model inputs may be derived from raw data. The term "recipe" or "data recipe" may include a complete pipeline containing the description of input data, (if applicable) the feature extraction on that input data, the model class to apply on that data (or the features derived from it) and (if applicable) the KPIs or models that shall be computed from a selected model.

Also, it should be noted that the self-managed adaptable model prediction system, as described herein, provides one or more adaptive models (e.g., "pluggable models") having the ability to automatically handle one or more changes in model classes. Thus, the self-managed adaptable model prediction system allows a model manager or analysts (external or internal) to be able to interact with the self-managed adaptable model prediction system to modify recipes and/or models.

As an additional aspect, the present invention provides the ability to declare new inputs extracted from external data sources and descriptive meta-data about the inputs. The present invention also provides the ability to declare new analytical model classes and an abstract description of the inputs required by the model and recipes required to bind the input streams to the model while also identifying one or more new instances of the model class.

One or more automatically created models may be browsed and/or searched. The present invention may retrieve model lineages, model classes, and/or data used to create the model. Aggregated metrics about the model quality may be viewed. Also, one or more existing models may be decommissioned. Predictive results of each model may be browsed while a result lineage of the models may be retrieved (e.g., retrieve the model and data and use the model and data to create the predictive results).

In summary, the present invention provides a solution for automating the application to and construction of an arbitrary number of adaptive models based on an arbitrary number of data flows/data streams (e.g., "input"). A model store/repository may be used to store model parameters, model classes, model or input/extracted feature descriptions, a pointer to the model's training (e.g., training data), and/or test and validation data.

A data recipe store may be provided to enable describing each data processing pipeline/workflow (e.g., data recipes). A data store may index all data sources available and provide access to itself. An application runtime operation may be performed for interpreting and deploying the data recipe/workflows described/included in the data recipe store (if required using the models from the model store).

In operation, the self-managed adaptable model prediction system may, for any new incoming data flow/data stream from one or more data sources, list each data recipe that may apply to the particular/specific data flow/data stream (e.g., a "best" or optimal data recipe). The one or more identified, selected, and/or optimal data recipes may be applied over a target application runtime while all the model's parameters and associated key performance indicators (KPIs) may be maintained, updated, and/or tracked.

For the incoming data flow/data stream (e.g., reacting to indexing of the new data sources into the system), a list of recipes that may apply to the data source may be automatically listed/provided. The applicable recipes may be deployed on the data source. Each of the new adaptive models, determined values and/or KPIs linked with the applicable recipes to the incoming data flow/data stream may be stored and indexed. Historical data may also be fetched from the data source required to apply the identified and/or selected data recipe. The applicable data recipes may be deployed on new data and the historical data retrieved from the data source. Each new or existing model, derived/determined values, and/or the KPIs that may be linked or associated with applying a selected recipe to the new data may be stored, indexed, and/or updated.

The workflows of the recipe for computing the models, KPIs, and the derived values may be defined. Also, the recipe may be added, maintained, and/or updated by the recipe store. The predictive outcomes of the recipes may also be filtered.

It is understood in advance that although this disclosure includes a detailed description on cloud computing, implementation of the teachings recited herein are not limited to a cloud computing environment or IoT network environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform selected, identified, and/or defined tasks or implement selected, identified, and/or defined abstract data types. Computer system/server 12 may be practiced in distributed cloud computing environments where tasks are performed by remote processing devices that are linked through a communications network or IoT network.

In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
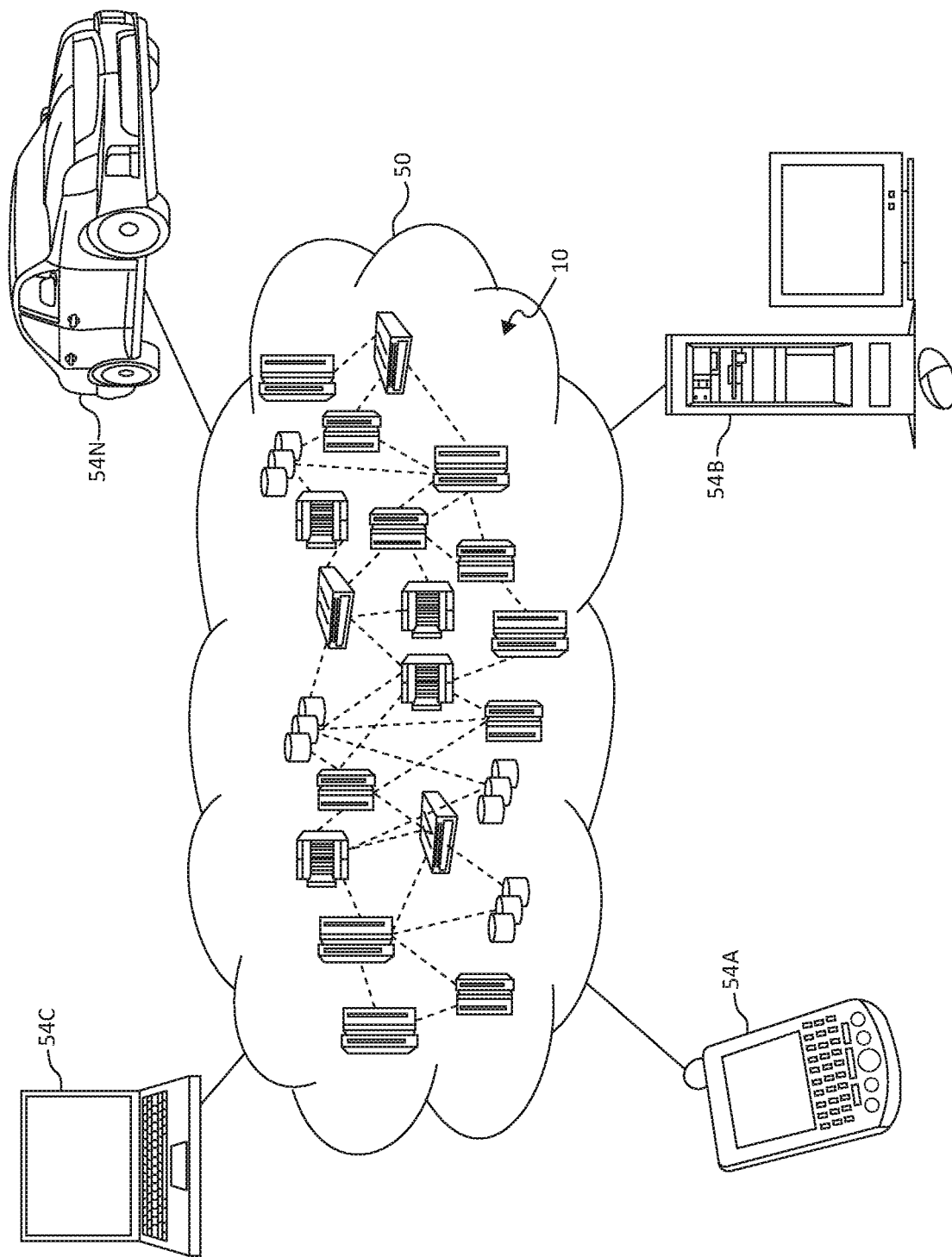
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
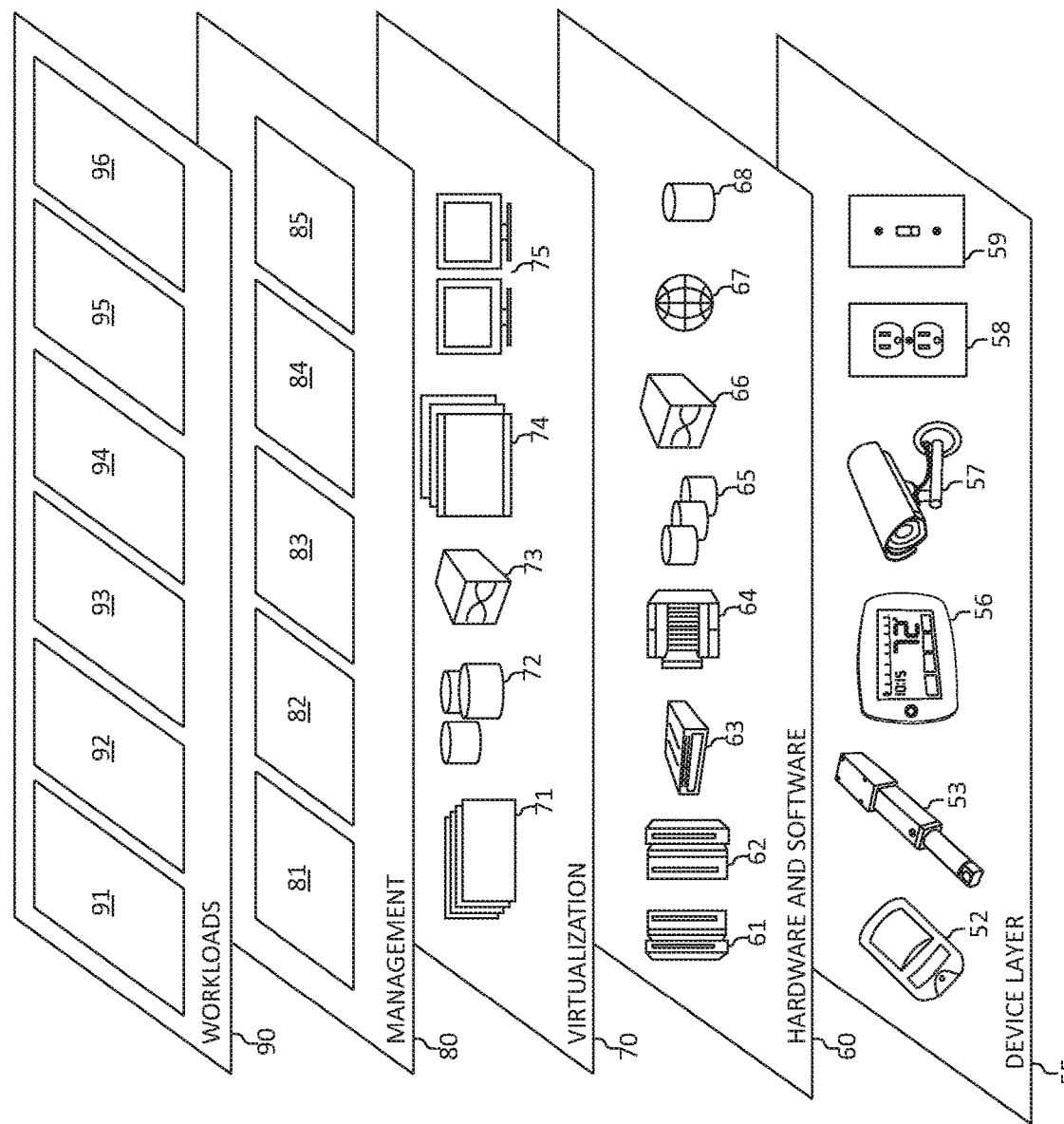
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost collecting as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various computer-controlled devices for self-managed adaptable models for prediction system workloads and functions 96. In addition, configuring settings for various computer-controlled devices using workloads and functions 96 for self-managed adaptable models for prediction system may include such operations as data analysis (including data collection and processing), semantic analysis, device analysis, and/or data analytics functions. One of ordinary skill in the art will appreciate that the configuring settings for various computer-controlled devices using workloads and functions 96 for self-managed adaptable models for prediction system may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
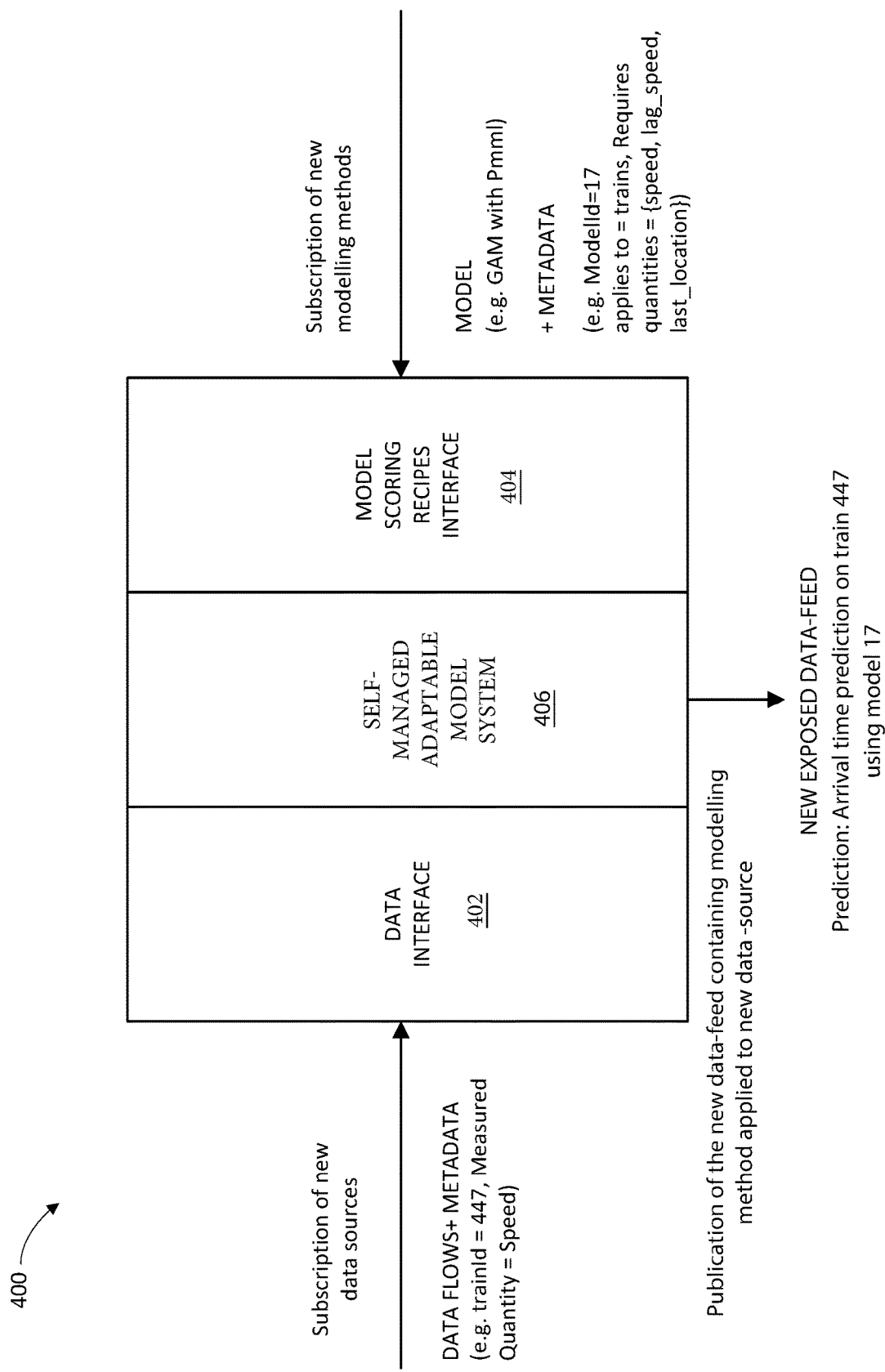
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. In one aspect, one or more of the components, modules, services, applications, and/or functions described in FIGS. 1-3 may be used in FIG. 4. For example, computer system/server 12 of FIG. 1 may be included in FIG. 4 and may be connected to other computing nodes (such as various computer systems) over a distributed computing network, where additional data collection, processing, analytics, and other functionality may be realized. The components of computer system/server 12 may include, but are not limited to, one or more processors or processing units 16, a system memory 28, and a bus 18 that couples various system components including system memory 28 to processor 16, although such components are not depicted for illustrative convenience.

A self-managed adaptable model system 406 is shown, incorporating one or more processing units (e.g., processing units 16 of FIG. 1) to perform various computational, data processing and other functionality in accordance with various aspects of the present invention. In one aspect, a data interface 402 is associated with the self-managed adaptable model system 406. A model scoring recipes interface 404 may also be associated with the self-managed adaptable model system 406.

In operation, a subscription of new data sources may flow or "stream" into the data interface 402. The data flows/data streams from the new data sources may include the data flow and metadata. For example, a vehicle (e.g., a train) may have a train identifier ("train id") equal to or assigned a value of "447". The measured quantity may be the speed of the train. Also, subscription of one or more new modeling operations may be inputted and/or included in the model scoring recipes interface 404. For example, a model (e.g., a GAM with Predictive Model Markup Language "PMML") and the metadata may be included in the model scoring recipes interface 404. For example, the model identifier ("model ID") may be the ID number 17. The model may be applied to an object of interest such as, for example, "trains" and may require data quantities of speed, lag speed, and/or a last location/previous position. Using the self-managed adaptable model system 406, as described herein, the output may be a publication of a new data-feed (e.g., a "prediction") containing an adaptable model applied to a new data source. For example, a new data-feed predicted by the self-managed adaptable model system 406 may be a "prediction" of arrival time on "train 447" using adaptable model 17.

In short, the self-managed adaptable model system 406 may automatically detect one or more potential model classes using abstract input declarations (e.g., abstract dependency declaration and resolution). The self-managed adaptable model system 406 may automatically compose bindings (e.g., dynamical bindings) according to data recipes specified in model class declarations. In one aspect, a model class declaration may include a model type, an abstract description of model inputs, model parameter values, and/or a combination thereof. The self-managed adaptable model system 406 may automatically create (e.g., "model spawning") one or more adaptable "pluggable" models from model classes as new predictor data streams are detected. The adaptable model responses may be automatically generated (e.g., model scoring) as a new combination of adaptable models and matching data inputs/data streams are discovered. The self-managed adaptable model system 406 may automatically maintain a lineage of models—a record of sources, training attributes, data sets used in training, validity ranges and other attributes. The self-managed adaptable model system 406 may also automatically train and/or re-train one or more adaptable models and maintain the model versions when new data/data streams become available.

In one aspect, calculations (e.g., scoring or ranking) may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

In one aspect, the various functional units in the self-managed adaptable model system 406 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

Figure 5:
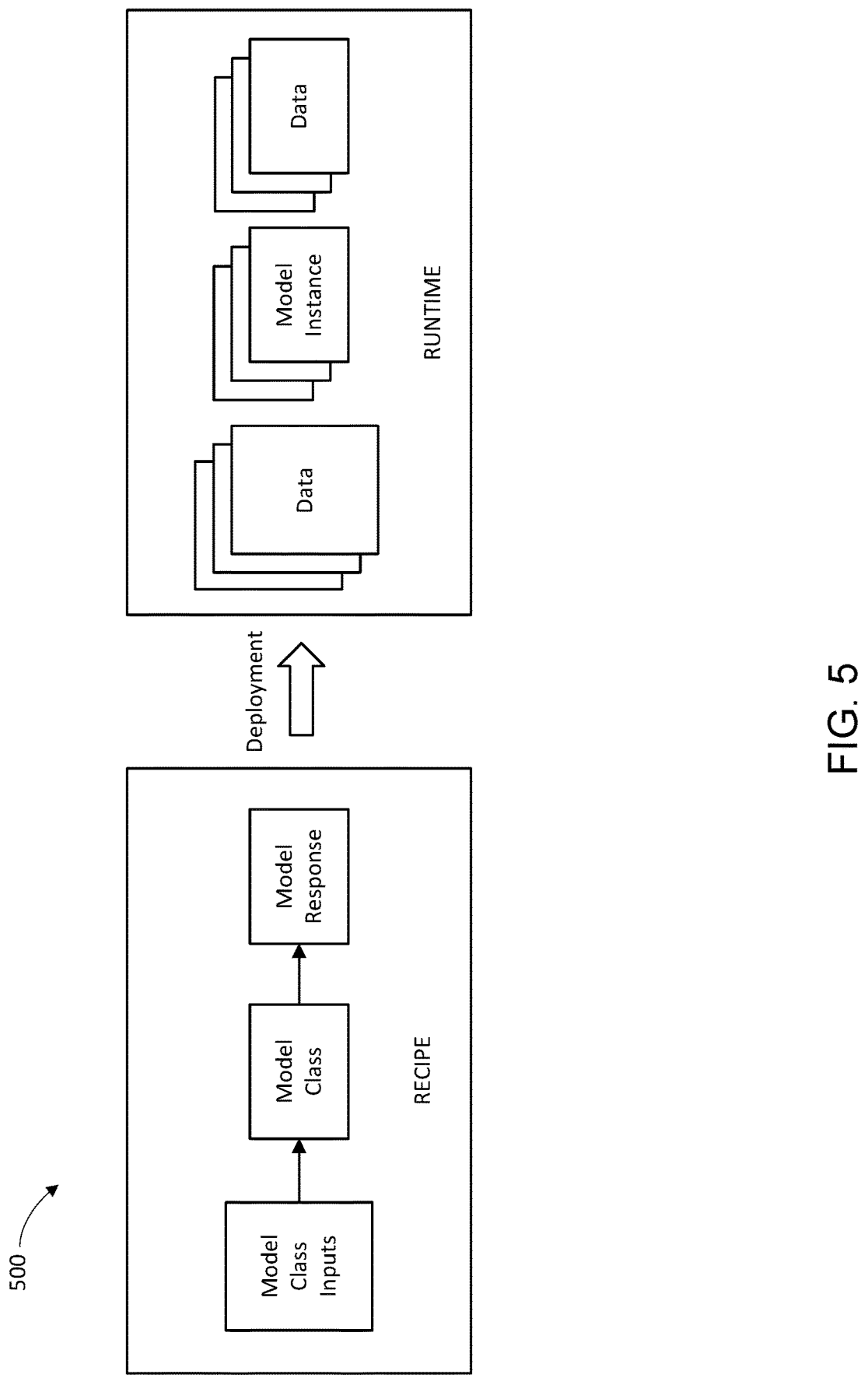
FIG. 5 is an additional block diagram depicting an exemplary functional relationship between various aspects of the present invention.

Turning now to FIG. 5, a block diagram depicting exemplary functional components 500 according to various mechanisms of the illustrated embodiments, is shown. In one aspect, one or more of the components, modules, services, applications, and/or functions described in FIGS. 1-4 may be used in FIG. 5. For example, computer system/server 12 of FIG. 1 may be included in FIG. 4 and may be connected to other computing nodes over a distributed computing network, where additional data collection, processing, analytics, and other functionality may be realized.

As illustrated, a self-managed adaptable model system 500 depicts the creation and implantation of a data recipe by one or more model instances. The data recipe may include one or more model class inputs being applied to one or more model classes. Again, the model class inputs may be an attribute expected by a model class, an individual measurable property of a phenomenon being observed, and/or use of the data definition. The model class input may indicate or specify a subset of the column IDs of data. The output of the one or more model classes may be a model response. Upon generating the model response, the data recipe may be deployed in a runtime operation. A model instance may be set of model parameters resulting from applying a model class to a selected, identified, and/or defined set of data (e.g., the data recipe). The model instance may be then applied to one or more data streams ("data") from one or more data sources. That is, one or more adaptive models (e.g., one or more model instances) may be generated, built, and then applied to the data streams from a plurality of data sources according to one or more data recipes such that the one or more adaptive models predict a plurality of target variables.

Figure 6:
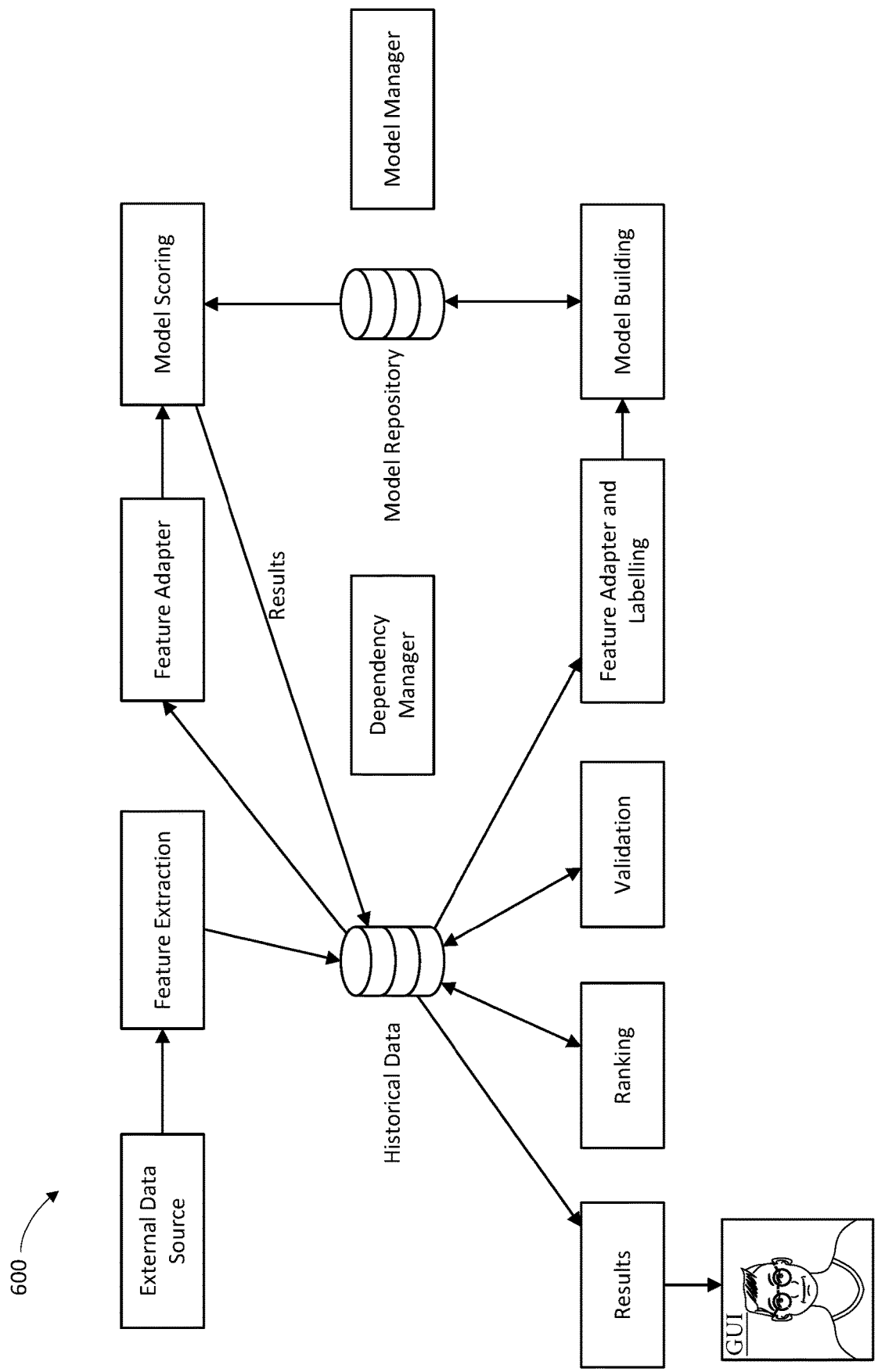
FIG. 6 is an additional block diagram depicting an exemplary functional relationship for self-managed adaptable models for prediction systems between various aspects of the present invention.

Turning now to FIG. 6, a block diagram depicting exemplary functional components 600 according to various mechanisms of the illustrated embodiments, is shown. In one aspect, one or more of the components, modules, services, applications, and/or functions described in FIGS. 1-5 may be used in FIG. 6. For example, computer system/server 12 of FIG. 1 may be included in FIG. 4 and may be connected to other computing nodes over a distributed computing network, where additional data collection, processing, analytics, and other functionality may be realized.

As illustrated in FIG. 6, a self-managed adaptable model system 600 may include a historical data repository receiving features (e.g., feature extraction) extracted from one or more external data sources. The extracted features may be sent to a feature adaptor, which in turn provides the extracted features for model scoring. The feature adaptor may dynamically bind the input/extracted features to a model class and transform the input/extracted features for the model class. That is, the extracted features may be automatically bound ("dynamic binding") to one or model classes. The results may then be returned to the historical data repository.

It should be noted that the self-managed adaptable model system 600 may include a model repository, which may be associated with and/or controlled by a model manager. The model repository may also be in communication with a dependency manager, which may determine which of the various model classes are an optimal or "best" fit for each input or "data stream" (abstract dependency declaration and resolution). The dependency manager cross-compiles features present in input data stream with model meta-data to determine "best" fit for forecasting.

The model repository may store, maintain, and/or update one or more adaptable models, model parameters, model class, training data, a pointer to the training data, or testing and validation data of the stored model. In this way, the model repository works with the feature adaptor to annotate each model class with the extracted features and provide a model scoring mechanism using the features to generate a forecast and/or prediction. One or more new adaptive models may be built/generated from the model classes and analytical results may be generated from the adaptive models as data becomes available. The new adaptive models may be stored, maintained, updated, and/or tracked in the model repository. The self-managed adaptable model system 600 may use new models (model spawning) from the various model classes when a new prediction stream (predictor variable) is detected, automatically manage new models, maintain a lineage of the models for audit or troubleshooting purposes (model harvesting), automatically (re)train the models as new input is available, and/or maintain/track model versions. The self-managed adaptable model system 600 may also trace the relationship between the models, the model classes, the input features and the outcome of the analytics.

Also, the historical data repository may be used, by the self-managed adaptable model system 600, to perform model validation model scoring (model management), dynamically bind and label each extracted feature, automatically compute new model responses as new input is available (model scoring), and/or automatically manage model responses, maintain lineage of model version and input (model response lineage).

The self-managed adaptable model system 600 may recreate model versions from historical data and model classes, repeat results from historical data and model versions, and/or compute and compare (rank) each of the predictive results of the one or more adaptive models. The historical data repository may be used, by the self-managed adaptable model system 600, to provide, via an interactive graphical user interface ("GUI"), validation data of the model, a ranking of the models, and results of the models.

Figure 7A:
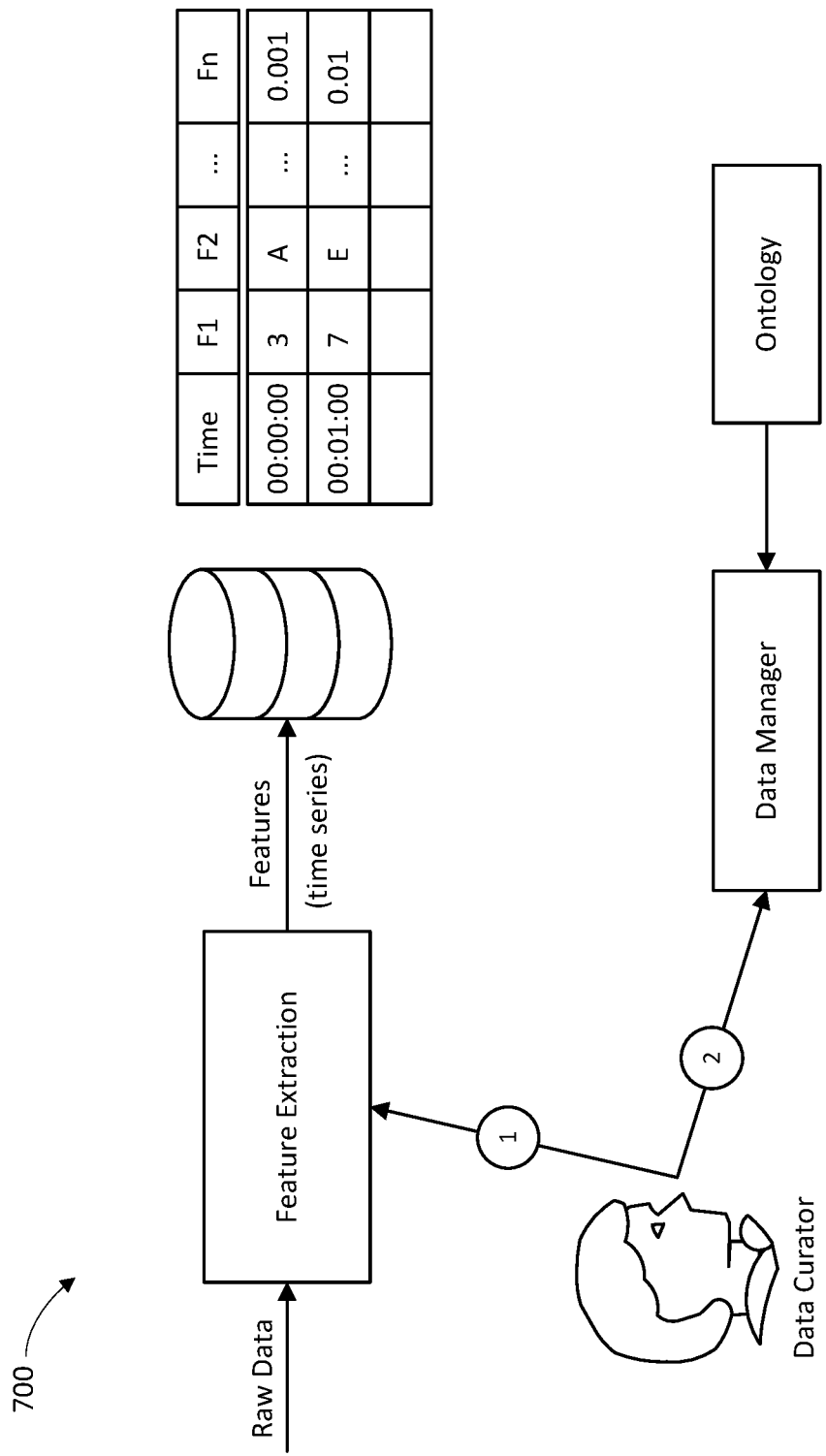
FIG. 7A-7C are additional block flow diagrams depicting an exemplary functional relationship for self-managed adaptable models for prediction systems between various aspects of the present invention.
Figure 7B:
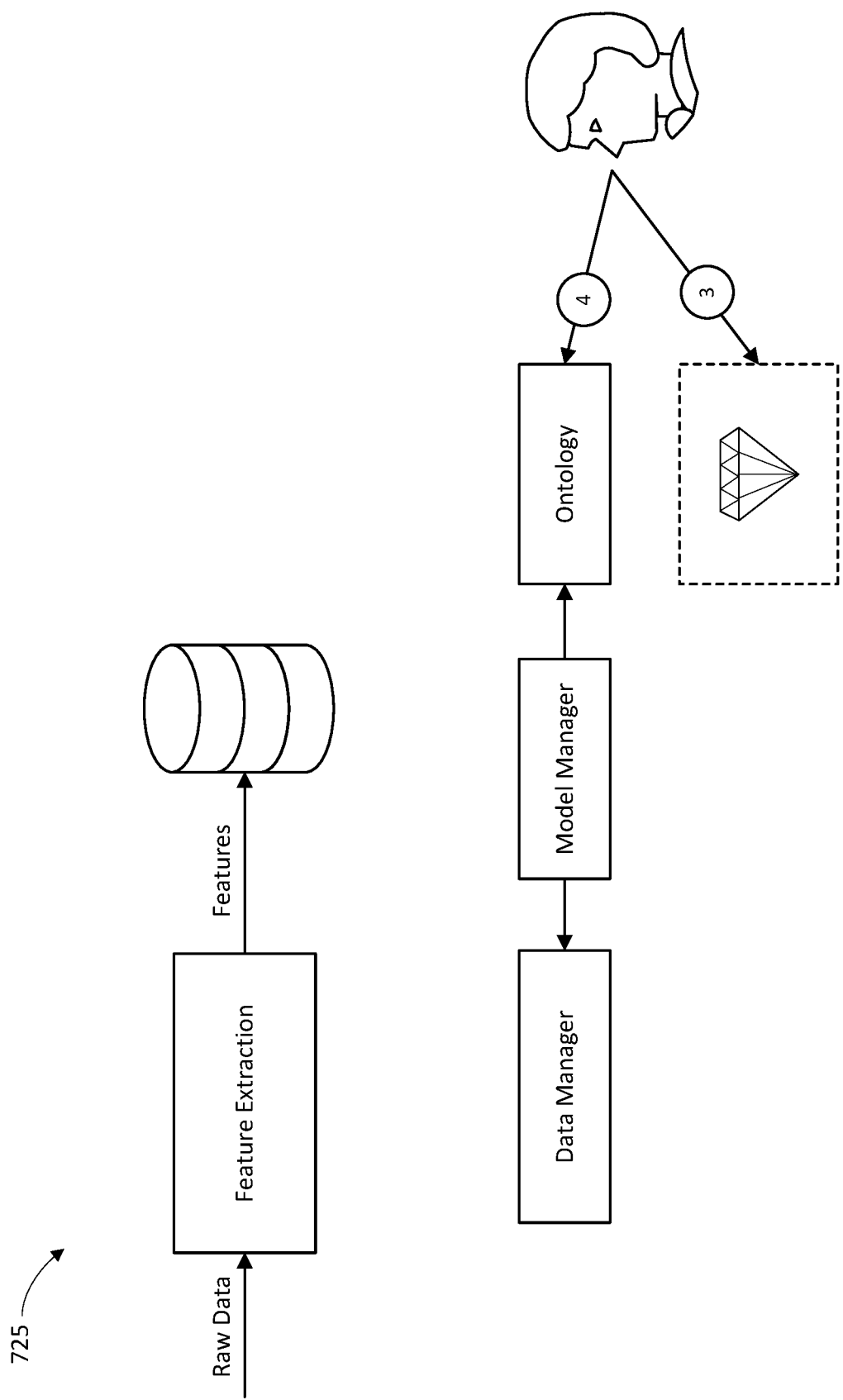
Figure 7C:
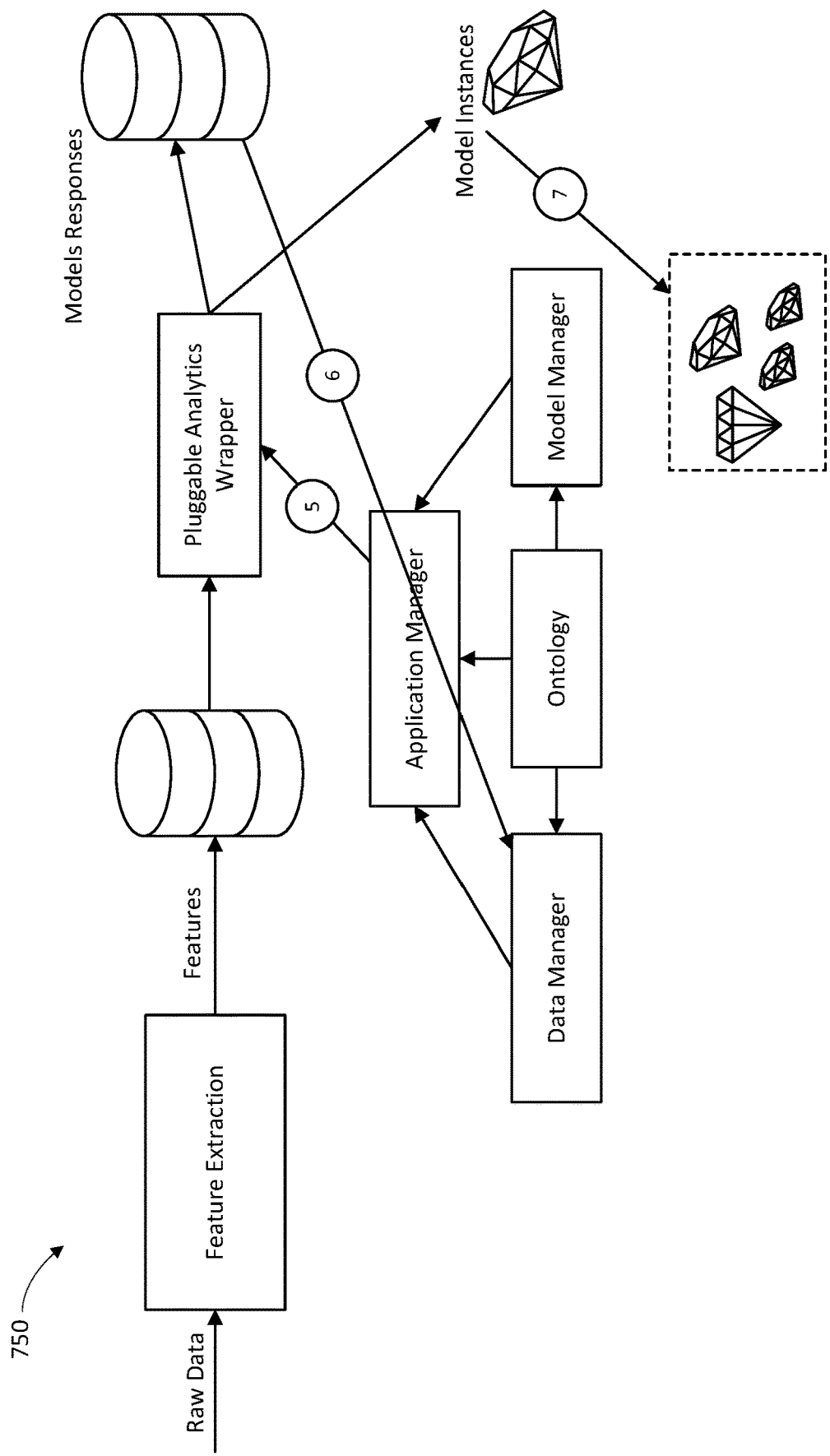

Turning now to FIGS. 7A-7C, functionality blocks 700, 725, and 750 depict an exemplary functional relationship for self-managed adaptable models for prediction systems between various aspects of the present invention. As shown, the various blocks of functionality are depicted with arrows designating the blocks' 700, 725, and 750 relationships with each other and to show process flow. Additionally, descriptive information is also seen relating each of the functional blocks 700, 725, and 750. As will be seen, many of the functional blocks may also be considered "modules" of functionality, in the same descriptive sense as has been previously described in FIGS. 1-6. With the foregoing in mind, the module blocks 700, 725, and 750 may also be incorporated into various hardware and software components of a system for self-managed adaptable models for prediction systems in accordance with the present invention. Many of the functional blocks 700, 725, and 750 may execute as background processes on various components, either in distributed computing components, or on the user device, or elsewhere, and generally unaware to the user performing generalized tasks for self-managed adaptable models for prediction systems. In one aspect, one or more of the blocks, components, modules, services, applications, and/or functions described in FIGS. 1-6 may be used in FIGS. 7A-7C.

As illustrated in FIG. 7A, 1) a set of features may be extracted from raw data of an incoming data stream (e.g. time series F1, F2, and/or FN) such as, for example, by a data manager or "data curator" (e.g., a computer application) and 2) register the new inputs/extracted features in a data manager. The new inputs/extracted features can be a number or categorical data. The inputs/extracted features may be annotated in the data manager with a description using terms from an ontology or knowledge domain, or a lexicon of tags (e.g. train type, train stop, time of day, type of day, etc.)

As depicted in FIG. 7B, 3) a new data model class may be created, generated, and/or built such as, for example, by a model manager (or data analyst). One or more new model classes may be registered and/stored in a model manager (e.g., a GAM model that predicts future travel times between geographical locations). The new model classes may be 4) annotated with an abstract description of required inputs, using terms from the same ontology used to describe the features. The abstract description of inputs required by the model may include one or more rules to partition the inputs/extracted features per models (i.e. specify a subset of features that can be used to form a unique key), filter expressions, and/or transform expressions to apply to data streams and any associated parameters of the model if the inputs are fed to a parametric model.

The term "ontology" is also a term intended to have its ordinary meaning. In one aspect, the term ontology in its broadest sense may include anything that can modeled as ontology, including but not limited to, taxonomies, thesauri, vocabularies, and the like. For example, an ontology may include information or content relevant to a domain of interest or content of a particular class or concept. Content can be any searchable information, for example, information distributed over a computer-accessible network, such as the Internet. A concept can generally be classified into any of a number of concepts which may also include one or more sub-concepts. Examples of concepts may include, but are not limited to, scientific information, healthcare information, transportation information, medical information, biomedical information, business information, educational information, commerce information, financial information, pricing information, information about individual people, cultures, groups, sociological groups, market interest groups, institutions, universities, governments, teams, or any other information group. The ontology can be continuously updated with the information synchronized with the sources, adding information from the sources to the ontology as models, attributes of models, or associations between models within the ontology.

As depicted in FIG. 7C, an application manager may check (periodically and/or at selected time periods), the model repository and identify/look for new data inputs that match the model classes abstract description. For each valid pairing of data inputs and model class abstract descriptions, if the model repository does not have a model response corresponding to this combination, the application manager may compose an application (and/or retrieve an application from a cache) using one or more data recipes found with the model class descriptions. The application manager may 5) deploy the application so that the model class is executed with the new input values. The output (e.g., model response) of the application may be 6) registered in the data manager. The application includes data transformation operations such as aggregations (e.g. group-by), filtering, and other transforms that are generated from the model class recipe. If the group-by operation results in an existing model instance, 7) the definition of the existing model instance may be pre-loaded from the model repository or if the model instance is a new model instance, the model instance may be registered in the model repository.

In this way, the self-managed adaptable models for prediction system enables flexible declaration of data input streams extracted from a plurality of data sources. That is, the self-managed prediction system allows for flexibility in publishing of data input streams, flexibility in subscribing to the data inputs, and matching of data streams to model instances. The model repository enables the flexible declaration of new model classes with an abstract description of data input dependencies of the model classes. A runtime system of the self-managed adaptable models for prediction system automatically resolves model-to-input dependencies and creates or scores each of the analytical models. A model manager automatically manages new models derived from the model classes and maintains the lineage of the models and the response of the model to an input for traceability purposes.

Figure 8:
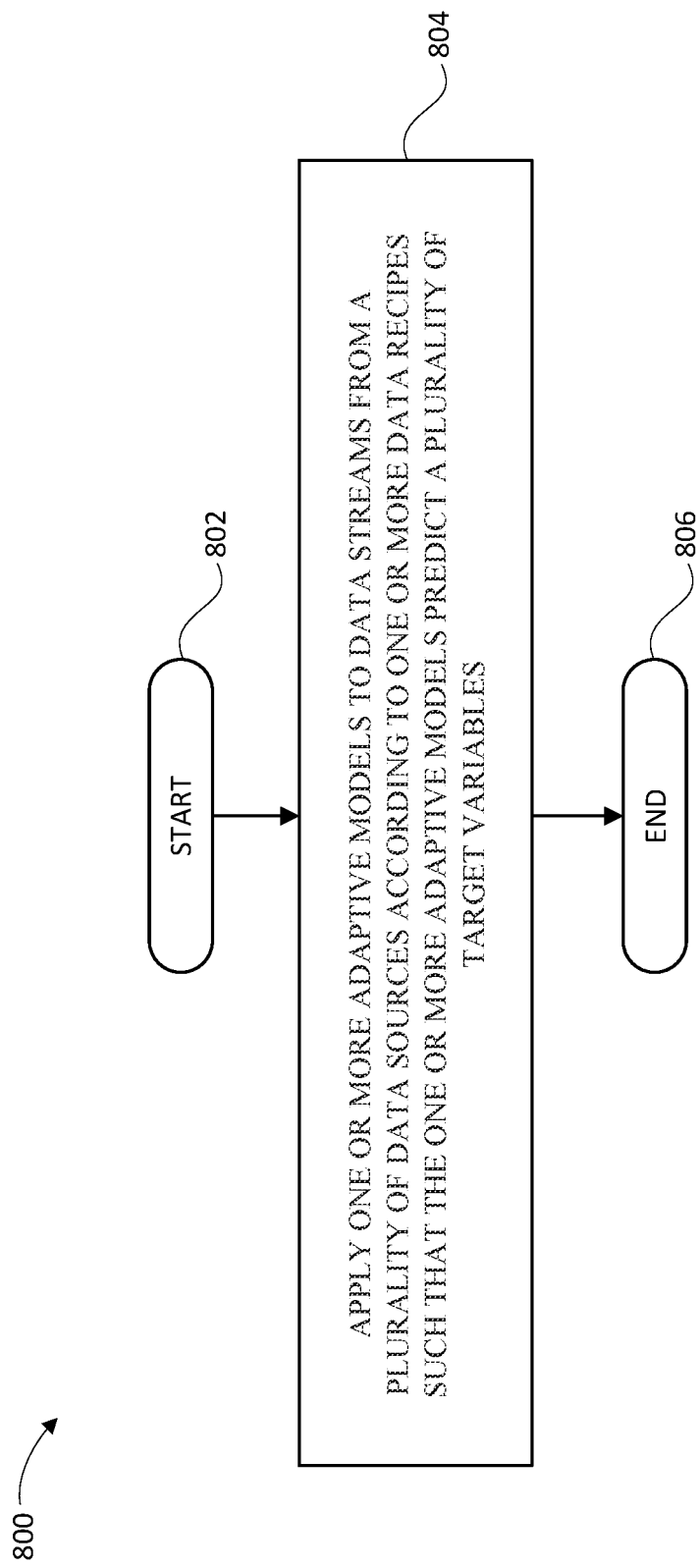
FIG. 8 is a flowchart diagram depicting an exemplary method for self-managed adaptable models for prediction systems by a processor, in which aspects of the present invention may be realized.

Turning now to FIG. 8, a method 800 for self-managed adaptable models for prediction systems by a processor is depicted, in which various aspects of the illustrated embodiments may be implemented. That is, FIG. 8 is a flowchart of an additional example method 800 for self-managed adaptable models for prediction systems of a computing environment according to an example of the present technology. The functionality 800 may be implemented as a method executed as instructions on a machine, where the instructions are included on at least one computer readable medium or one non-transitory machine-readable storage medium. The functionality 800 may start in block 802. One or more adaptive models may be applied to data streams from a plurality of data sources according to one or more data recipes such that the one or more adaptive models predict a plurality of target variables, as in block 804. The functionality 800 may end, as in block 806.

Turning now to FIG. 9, a method 900 for self-managed adaptable models for prediction systems by a processor is depicted, in which various aspects of the illustrated embodiments may be implemented. That is, FIG. 9 is a flowchart of an additional example method 900 for self-managed adaptable models for prediction systems of a computing environment according to an example of the present technology. The functionality 900 may be implemented as a method executed as instructions on a machine, where the instructions are included on at least one computer readable medium or one non-transitory machine-readable storage medium. The functionality 900 may start in block 902. One or more features may be extracted from the data streams, wherein the extracted features are assimilated and pre-processed and an ontology may be used to describe the one or more extracted features, as in block 904. The extracted features may be dynamically bound to one or more model classes, as in block 906. One or more adaptable models may be created from the one or more model classes, which may be annotated with the extracted features, as in block 908. The one or more adaptive models may be applied to data streams from a plurality of data sources according to one or more data recipes such that the one or more adaptive models predict a plurality of target variables, as in block 910. One or more parameters and associated key performance indicators (KPIs) of the one or more adaptive models may be updated (e.g., stored, updated, and/or maintained), as in block 912. The functionality 900 may end, as in block 914.

In one aspect, in conjunction with and/or as part of at least one block of FIGS. 8-9, the operations of 800 and 900 may include each of the following. The operations of 800 and 900 may include extracting one or more features from the data streams, wherein the extracted features are assimilated and pre-processed, wherein an ontology is used to describe the one or more extracted features; dynamically binding the extracted features of the data streams to one or more model classes; and/or annotating the one or more model classes with the one or more extracted features, wherein the one or more data recipes include the extracted features of the data streams, the one or more model classes for application on the data streams by the one or more adaptive models, and key performance indicators (KPIs). One or more model classes in one or more data recipes may be matched with the data streams. One or more adaptive models may be generated from one or more model classes having extracted features bound thereto.

The operations of 800 and 900 may include indexing each one of the plurality of data sources, identifying the one or more data recipes that are associated with each one of the plurality of data sources, deploying the one or more data recipes to the selected number of data streams from a plurality of data sources, retrieving historical data from a data source required to apply the one or more data recipes to the selected number of data streams, and/or updating parameters and associated key performance indicators (KPIs) of the one or more adaptive models. Also, a model stored in a model store may be used as one of the one or more adaptable models, wherein the model store includes model parameters, model class, training data, a pointer to the training data, or testing and validation data of the stored model.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for self-managed adaptable models for prediction systems, comprising:
    extracting one or more features from data streams of new incoming data from a plurality of data sources, wherein the extracted features are pre-processed;
    dynamically binding the extracted features of the data streams to one or more model classes of existing models generated prior to receiving the data streams of new incoming data, wherein the existing models of the one or more model classes are stored in a model store database;
    annotating the one or more model classes with the one or more extracted features;
    automatically modifying each one or more of the existing models, independently, selected according to one or more data recipes of the data streams to generate one or more adaptive models, wherein the one or more data recipes include the extracted features of the data streams, the one or more model classes for application on the data streams by the one or more adaptive models, and key performance indicators (KPIs); and applying the one or more adaptive models to the data streams from the plurality of data sources such that the one or more adaptive models predict a plurality of target variables of the data streams;

maintaining, in the model store database, a model lineage of each of the one or more adaptive models to indicate the modifications performed to the one or more existing models over a training phase when performing the modifying by taking snapshots of a model instance of the one or more existing models, having a specific set of model parameters set from applying the one or more model classes to the new incoming data, at incremental intervals during the modifying, wherein the model lineage is annotated to the model instance and includes a record of data sources, training attributes, training data used in the training phase, a pointer to the training data, and testing and validation data of the model instance at the incremental intervals; and as subsequent incoming data from subsequent data streams is received, using the extracted features of the subsequent incoming data to search the model store database to identify those of the one or more existing models of a same model class required by the extracted features to modify into a subsequently generated adaptive model, wherein searching the model store database includes matching the extracted features of the subsequent incoming data to abstract descriptions of the one or more data recipes of the data streams and using selected model parameters of the one or more existing models having the matched abstract descriptions to generate the subsequently generated adaptive model.

2. The method of claim 1, wherein an ontology is used to describe the one or more extracted features.

3. The method of claim 1, further including matching the one or more model classes in the one or more data recipes with the data streams.

4. The method of claim 1, further including
indexing each one of the plurality of data sources; and
identifying the one or more data recipes that are associated with each one of the plurality of data sources.

5. The method of claim 1, further including:
deploying the one or more data recipes to the selected number of data streams from a plurality of data sources;
retrieving historical data from a data source of the plurality of data sources required to apply the one or more data recipes to the selected number of data streams; and
updating parameters and associated ones of the KPIs of the one or more adaptive models.

6. The method of claim 1, wherein the model store includes the model parameters, model class, the training data, the pointer to the training data, or the testing and validation data of the one or more existing models stored in the model store.

7. A system for self-managed adaptable models for prediction systems, comprising:
one or more computers with executable instructions that when executed cause the system to:
extract one or more features from data streams of new incoming data from a plurality of data sources, wherein the extracted features are pre-processed;
dynamically bind the extracted features of the data streams to one or more model classes of existing models generated prior to receiving the data streams of new incoming data, wherein the existing models of the one or more model classes are stored in a model store database;
annotate the one or more model classes with the one or more extracted features;
automatically modify each one or more of the existing models, independently, selected according to one or more data recipes of the data streams to generate one or more adaptive models, wherein the one or more data recipes include the extracted features of the data streams, the one or more model classes for application on the data streams by the one or more adaptive models, and key performance indicators (KPIs);
apply the one or more adaptive models to the data streams from the plurality of data sources such that the one or more adaptive models predict a plurality of target variables of the data streams;
maintain, in the model store database, a model lineage of each of the one or more adaptive models to indicate the modifications performed to the one or more existing models over a training phase when performing the modifying by taking snapshots of a model instance of the one or more existing models, having a specific set of model parameters set from applying the one or more model classes to the new incoming data, at incremental intervals during the modifying, wherein the model lineage is annotated to the model instance and includes a record of data sources, training attributes, training data used in the training phase, a pointer to the training data, and testing and validation data of the model instance at the incremental intervals; and
as subsequent incoming data from subsequent data streams is received, use the extracted features of the subsequent incoming data to search the model store database to identify those of the one or more existing models of a same model class required by the extracted features to modify into a subsequently generated adaptive model, wherein searching the model store database includes matching the extracted features of the subsequent incoming data to abstract descriptions of the one or more data recipes of the data streams and using selected model parameters of the one or more existing models having the matched abstract descriptions to generate the subsequently generated adaptive model.

8. The system of claim 7, wherein an ontology is used to describe the one or more extracted features; and
wherein the executable instructions further match the one or more model classes in the one or more data recipes with the data streams.

9. The system of claim 7, wherein the executable instructions further:
index each one of the plurality of data sources; and
identify the one or more data recipes that are associated with each one of the plurality of data sources.

10. The system of claim 7, wherein the executable instructions further:
deploy the one or more data recipes to the selected number of data streams from a plurality of data sources;
retrieve historical data from a data source of the plurality of data sources required to apply the one or more data recipes to the selected number of data streams; and
update parameters and associated ones of the KPIs of the one or more adaptive models.

11. The system of claim 7, wherein the model store includes the model parameters, model class, the training data, the pointer to the training data, or the testing and validation data of the one or more existing models stored in the model store.

12. A computer program product for, by a processor, self-managed adaptable models for prediction systems, the computer program product comprising a non-transitory computer-readable storage medium having computer-readable program code portions stored therein, the computer-readable program code portions comprising:

an executable portion that extracts one or more features from data streams of new incoming data from a plurality of data sources, wherein the extracted features are pre-processed;

an executable portion that dynamically binds the extracted features of the data streams to one or more model classes of existing models generated prior to receiving the data streams of new incoming data, wherein the existing models of the one or more model classes are stored in a model store database;

an executable portion that annotates the one or more model classes with the one or more extracted features;

an executable portion that automatically modifies each one or more of the existing models, independently, selected according to one or more data recipes of the data streams to generate one or more adaptive models, wherein the one or more data recipes include the extracted features of the data streams, the one or more model classes for application on the data streams by the one or more adaptive models, and key performance indicators (KPIs);

an executable portion that applies the one or more adaptive models to the data streams from the plurality of data sources such that the one or more adaptive models predict a plurality of target variables of the data streams;

an executable portion that maintains, in the model store database, a model lineage of each of the one or more adaptive models to indicate the modifications performed to the one or more existing models over a training phase when performing the modifying by taking snapshots of a model instance of the one or more existing models, having a specific set of model parameters set from applying the one or more model classes to the new incoming data, at incremental intervals during the modifying, wherein the model lineage is annotated to the model instance and includes a record of data sources, training attributes, training data used in the training phase, a pointer to the training data, and testing and validation data of the model instance at the incremental intervals; and an executable portion that, as subsequent incoming data from subsequent data streams is received, uses the extracted features of the subsequent incoming data to search the model store database to identify those of the one or more existing models of a same model class required by the extracted features to modify into a subsequently generated adaptive model, wherein searching the model store database includes matching the extracted features of the subsequent incoming data to abstract descriptions of the one or more data recipes of the data streams and using selected model parameters of the one or more existing models having the matched abstract descriptions to generate the subsequently generated adaptive model.

13. The computer program product of claim 12, wherein an ontology is used to describe the one or more extracted features; and further including an executable portion that matches the one or more model classes in the one or more data recipes with the data streams.

14. The computer program product of claim 12, further including an executable portion that:

indexes each one of the plurality of data sources; and identifies the one or more data recipes that are associated with each one of the plurality of data sources.

15. The computer program product of claim 12, further including an executable portion that:

deploys the one or more data recipes to the selected number of data streams from a plurality of data sources;

retrieves historical data from a data source of the plurality of data sources required to apply the one or more data recipes to the selected number of data streams; and updates parameters and associated ones of the KPIs of the one or more adaptive models.

16. The computer program product of claim 12, wherein the model store includes the model parameters, model class, the training data, the pointer to the training data, or the testing and validation data of the one or more existing models stored in the model store.

* * * * *